(12) United States Patent
Kang et al.

(10) Patent No.: US 6,453,027 B1
(45) Date of Patent: Sep. 17, 2002

(54) MULTIFUNCTION KEYBOARD

(76) Inventors: Gyu-Hwan Kang, 95-14, Sapa-dong, Changwon-si, Kyongsangnamdo, Changwon-si (KR); Weon-Il Kong, 52-5, Banji-dong, Changwon-si, Kyongsangnamdo, Changwon-si (KR)

( * ) Notice: Subject to any disclaimer, the term of this patent is extended or adjusted under 35 U.S.C. 154(b) by 169 days.

(21) Appl. No.: 09/695,582

(22) Filed: Oct. 24, 2000

(30) Foreign Application Priority Data

Mar. 24, 2000 (KR) .............................. 00-15050

(51) Int. Cl.$^7$ ...................... H04M 111/00; H04M 11/04
(52) U.S. Cl. .................. 379/110.01; 379/41; 345/168; 341/22; 708/109
(58) Field of Search ........................ 379/110.01, 90.01, 379/39–44, 47, 51; 341/21, 22, 27; 708/109; 345/168

(56) References Cited

U.S. PATENT DOCUMENTS

| | | | | |
|---|---|---|---|---|
| 5,892,503 A | * | 4/1999 | Kim | 341/22 |
| 6,081,207 A | | 6/2000 | Batio | 341/20 |
| 6,103,979 A | | 8/2000 | Motoyama et al. | 200/4 |
| 6,104,385 A | | 8/2000 | Hobbs | 345/168 |

FOREIGN PATENT DOCUMENTS

WO  WO 92/03884  * 3/1992 ............ 379/110.01

* cited by examiner

*Primary Examiner*—Wing F. Chan
(74) *Attorney, Agent, or Firm*—Auslander & Thomas

(57) ABSTRACT

A multifunction keyboard for performing a variety of functions such as an Internet phone function, audio input/output function, computer speaker switching function, recording function, burglar alarm function, telephone function, etc. in addition to the original function of displaying characters and symbols on the screen of a monitor. The multifunction keyboard comprises a computer speaker switching unit for adjusting a tone level and performing a computer speaker/headset mode switching operation, an audio input/output unit having audio input and output terminals for inputting and outputting audio signals, a semiconductor-type recording unit having a recording button for performing a recording operation while it is pushed by the user, and a play button for performing a playback operation when it is pushed by the user in a one-touch manner, a telephone unit for conducting a direct conversation with a call-connected party and performing an Internet phone function, telephone function, extension exchange function, redial function, mute function, hook function, flash function, headset function, speaker phone function and message recording function, and a burglar alarm unit having a PIR sensor for sensing a body temperature of a trespasser, a door opening sensor, an LPG/LNG sensor and a fire sensor. Burglar alarm unit with the multifunction keyboard is comprised by internal external devices of the own designer.

7 Claims, 9 Drawing Sheets

MULTIFUNCTION KEYBOARD

BACKGROUND OF THE INVENTION

1. Field of the Invention

The present invention relates in general to a keyboard with a variety of functions, and more particularly to a multifunction keyboard which is capable of performing a variety of functions such as an Internet phone function, audio input/output function, computer speaker switching function, recording function, burglar alarm function, telephone function, etc. in addition to the original function of displaying characters and symbols on the screen of a monitor.

2. Description of the Prior Art

Computers have become widespread as things of daily necessity in all areas of society such as government offices, companies, homes, schools, etc.

Such a computer generally comprises a monitor for processing characters or pictures and providing the resultant images to the user, and a keyboard acting as enter means for displaying the characters or pictures on the screen of the monitor.

The keyboard generally has a plurality of Korean/English character keys. If the user pushes desired ones of the character keys using his fingers, then characters of the pushed keys are displayed on the screen of the monitor.

In detail, the keyboard has several operating keys, English/Korean character keys and Arabic numeral keys mounted on its body. If the user pushes desired ones of such keys using his/her fingers, then characters or numerals of the pushed keys are displayed on the screen of the monitor or operations corresponding to those keys are performed.

The construction and operation of the keyboard are well known to those skilled in the art and a more detailed description thereof will thus be omitted.

However, conventional keyboards have a disadvantage in that they cannot perform any function other than the original function of displaying characters and symbols on the screen of a monitor.

SUMMARY OF THE INVENTION

Therefore, the present invention has been made in view of the above mentioned problem, and it is an object of the present invention to provide a multifunction keyboard which is capable of performing a variety of functions such as an Internet phone function, audio input/output function, computer speaker switching function, recording function, burglar alarm function, telephone function, etc. in addition to the original function of displaying characters and symbols on the screen of a monitor, thereby maximizing utilization of space and convenience in use.

In accordance with the present invention, the above and other objects can be accomplished by a provision of a multifunction keyboard comprising computer speaker switching means for adjusting a tone level and performing a computer speaker/headset mode switching operation; audio input/output means having audio input and output terminals for inputting and outputting audio signals; semiconductor-type recording means having a recording button for performing a recording operation while it is pushed by the user, and a play button for performing a playback operation when it is pushed by the user in a one-touch manner; telephone means for conducting a direct conversation with a call-connected party and performing an Internet phone function, a telephone function, an extension exchange function, a redial function, a mute function, a hook function, a flash function, a headset function, a speaker phone function and a message recording function; and burglar alarm means having a pyroelectric infrared(PIR) sensor for sensing a body temperature of a trespasser, a door opening sensor, a liquefied petroleum gas/liquefied natural gas sensor and a fire sensor, the burglar alarm means sensing the body temperature of the trespasser or an abnormal situation in the surroundings, automatically establishing a call to a preset telephone number, at once transferring a voice message and a sensed on-the-spot sound to the preset telephone number and generating an alarm thereto.

Preferably, if a plurality of telephone numbers are preset, the above burglar alarm means may generate alarms to the preset telephone numbers and repetitively cycle through the preset telephone numbers from the beginning to the end.

More preferably, the above burglar alarm means may be configured to be remotely controllable by an external telephone.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
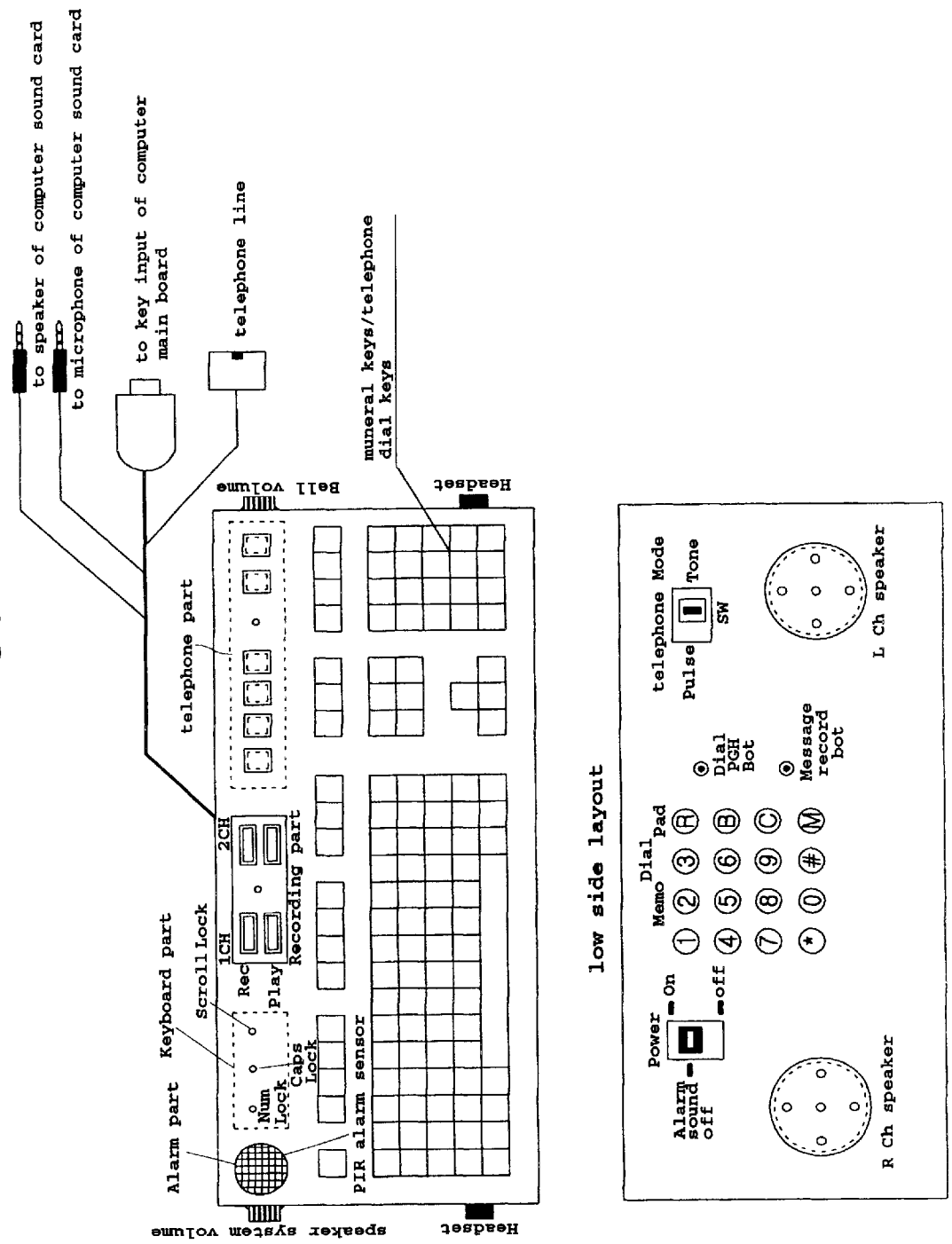
FIG. 1 is a view showing the overall construction of a multifunction keyboard in accordance with the present invention.

FIG. 1 is a view showing the overall construction of a multifunction keyboard in accordance with the present invention. As shown in this drawing, the multifunction keyboard comprising a computer speaker switching unit, audio input/output unit, semiconductor-type recording unit, telephone unit and burglar alarm unit.

The multifunction keyboard may preferably be a keyboard for an IBM-model personal computer.

The computer speaker switching unit is adapted to adjust a tone level and perform a computer speaker/headset mode switching operation.

The audio input/output unit has audio input and output terminals for inputting and outputting audio signals.

The semiconductor-type recording unit has a recording button for performing a recording operation while it is pushed by the user, and a play button for performing a playback operation when it is pushed by the user in a one-touch manner.

The telephone unit is adapted to conduct a direct conversation with a call-connected party and perform an Internet phone function, telephone function, extension exchange function, redial function, mute function, hook function, flash function, headset function, speaker phone function and message recording function.

The burglar alarm unit has a pyroelectric infrared (PIR) sensor for sensing a body temperature of a trespasser, a door opening sensor, a liquefied petroleum gas (LPG)/liquefied natural gas (LNG) sensor and a fire sensor. The burglar alarm unit is adapted to sense the body temperature of the trespasser or an abnormal situation in the surroundings, automatically establish a call to a preset telephone number, at once transfer a voice message and a sensed on-the-spot sound to the telephone number and generate an alarm thereto. In the case where a plurality of telephone numbers are preset, the burglar alarm unit generates alarms to the preset telephone numbers and repetitively cycles through the preset telephone numbers from the beginning to the end. The burglar alarm unit is remotely controllable by an external telephone.

Now, a detailed description will be given of the construction and operation of the multifunction keyboard in accordance with the present invention with reference to the accompanying drawings.

First, the construction and operation of the telephone unit in the multifunction keyboard will be described with reference to FIGS. 2, 3 and 8.

Figure 2:
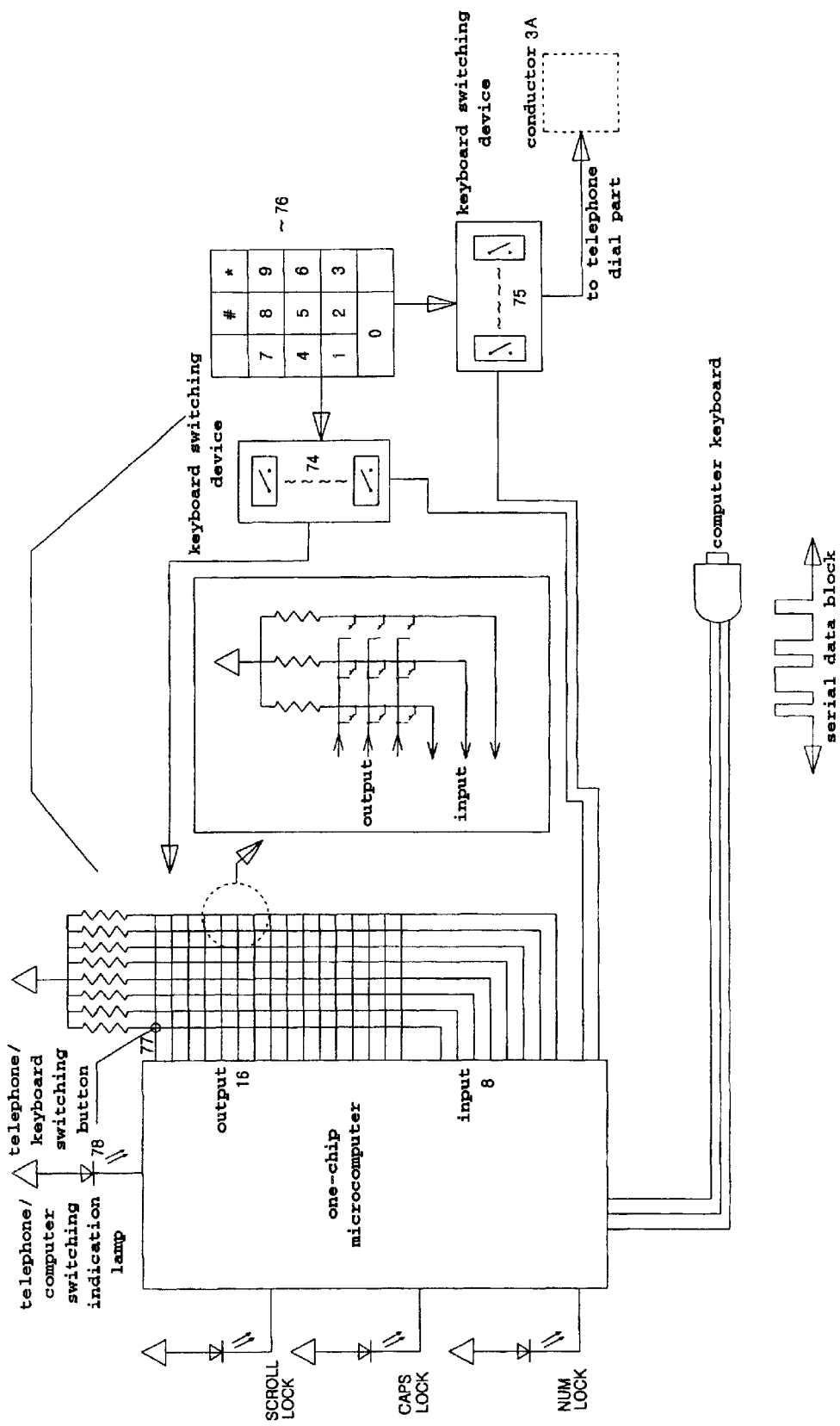
FIG. 2 is a functional block diagram of the multifunction keyboard in accordance with the present invention.
Figure 3:
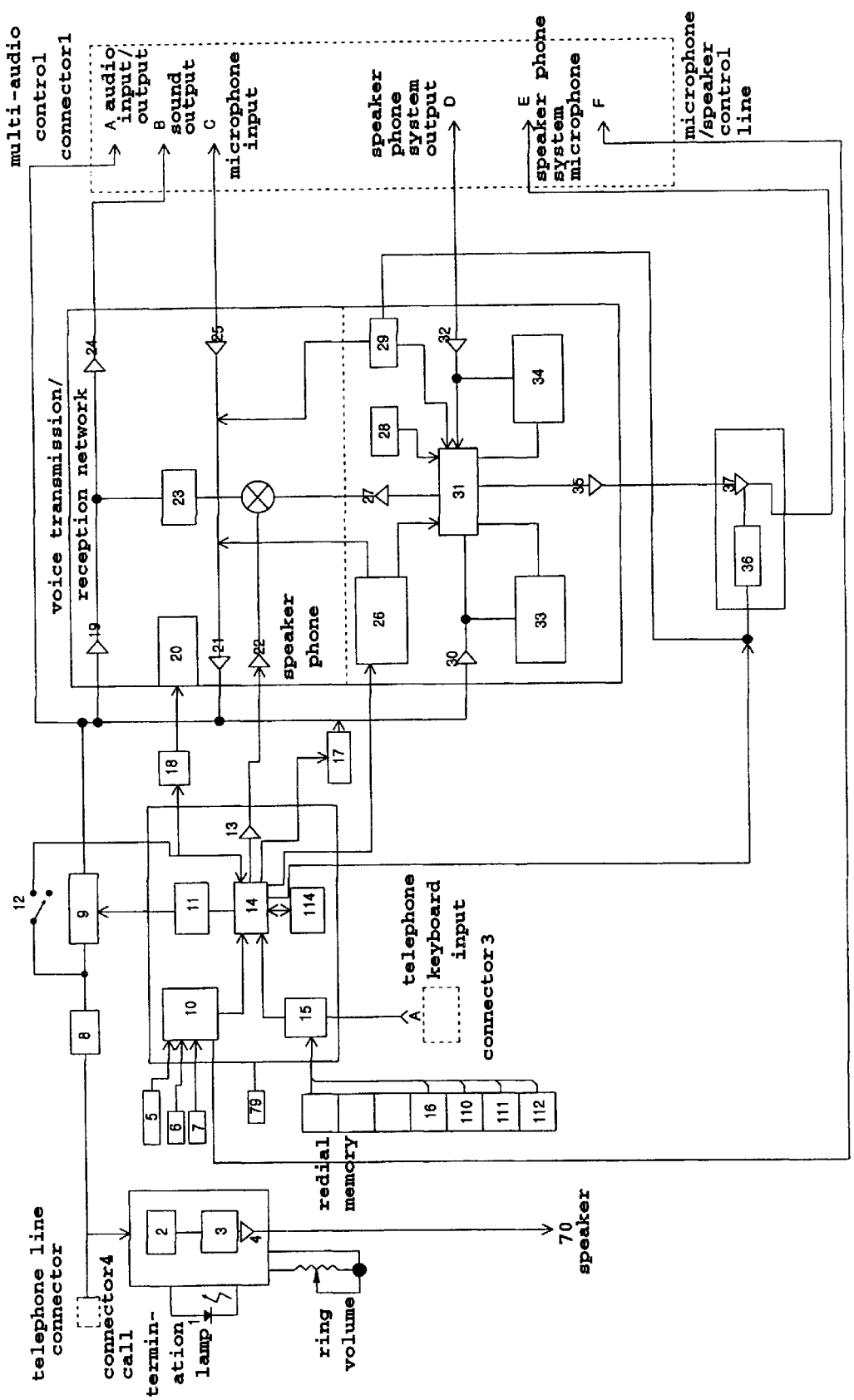
FIG. 3 is a functional block main diagram of a telephone unit in the multifunction keyboard in accordance with the present invention.
Figure 8:
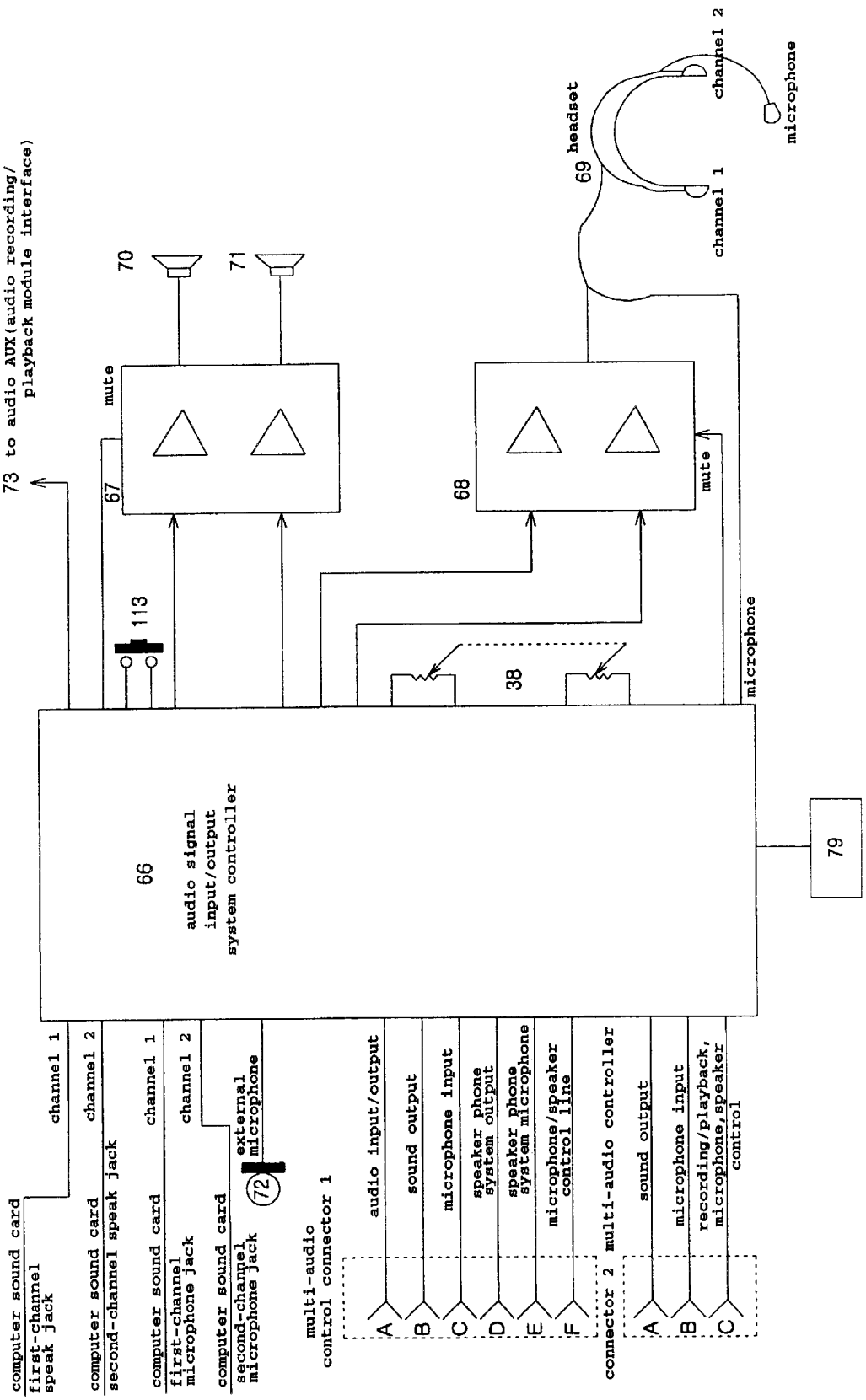
FIG. 8 is a functional block diagram of a computer speaker switching unit in the multifunction keyboard in accordance with the present invention.

FIG. 2 is a functional block diagram of the multifunction keyboard in accordance with the present invention, FIG. 3 is a functional block diagram of the telephone unit in the multifunction keyboard in accordance with the present invention and FIG. 8 is a functional block diagram of the computer speaker switching unit in the multifunction keyboard in accordance with the present invention. The components of telephone system and operating procedures are as follows;

First, upon receiving a telephone call, a call termination lamp 1 is turned on, which is projected out of the land of the keyboard.

At the same time that the call termination lamp 1 is turned on, a ringer circuit generates a ring signal and outputs it externally through a first channel speaker 70. To this end, the ringer circuit includes a bridge diode 2, ring chip 3 and ring amplifier 4.

If the telephone bell rings in the above manner, then a hook button 12 is turned off, thereby allowing a telephone system controller 18 to control a voice transmission/reception network one-chip controller 20.

Under the control of the telephone system controller 18, the voice transmission/reception network one-chip controller connects a voice transmission/reception network circuitry to an audio signal input/output system controller 66 in the computer speaker switching unit via a connector 1C. The voice transmission/reception network circuitry is provided with a reception amplifier 19, reception buffer 24, automatic gain controller 23, transmission amplifier 21 and audio signal amplifier 25.

In the case where a hands-free button 5 is turned on, an input controller 10 controls the input of an audio signal from a call-connected party. Under the control of the input controller 10, a tone pulse generator 14 generates a tone pulse signal corresponding to the audio signal from the call-connected party. A speaker phone controller 26 controls the input/output of a speaker phone. An attenuation controller 31 controls an attenuation level of the tone pulse signal from the tone pulse generator 14 under the control of the speaker phone controller 26. Two amplifiers 35 and 37 sequentially amplify an output signal from the attenuation controller 31 and transfer the amplified signal to the audio signal input/output system controller 66. As a result, the user can listen to the call-connected party's voice through the speaker phone.

When a headset/speaker mode switching button 79 and a speaker phone button 7 are pushed by the user, the audio signal input/output system controller 66 switches a telephone reception path from a headset 69 to the first channel speaker 70 and a second channel speaker 71.

For voice transmission, the audio signal input/output system controller 66 automatically selects one of the headset 69 and an external microphone 72 according to a given system condition. An audio signal from the selected headset 69 or external microphone 72 is transferred to the transmission amplifier 21 via a connector 1D, an amplifier 32 and the attenuation controller 31. Then, the transmission amplifier 21 amplifies the transferred audio signal and transmits the amplified audio signal to a telephone line. As a result, the user's voice is sent to the call-connected party.

The attenuation controller 31 is connected to a reception level balancer 33 for the balancing of a reception level and also to an amplifier 27 and the automatic gain controller 23 for voice transmission/reception.

In the case where a hold button 6 is turned on, the input controller 10 controls the tone pulse generator 14 to generate a tone pulse signal. A melody generator 17 generates a melody in response to the tone pulse signal from the tone pulse generator 14. A telephone number memory 114 is adapted to store preset telephone numbers and a telephone number to be redialed.

An extension number storage button 111 stores extension numbers in the telephone number memory 114 in association with a telephone number enter function. An extension exchange button 110 is adapted to perform an extension exchange function in association with the telephone number enter function.

The extension exchange button 110 is supported with an exchange service from a main telephone exchange such that it places an external call on hold while connecting the external call to a desired extension number, thereby providing the user with a convenience in use.

The reference numeral 112, denotes a flash button, 16 denotes a function key button not described, and 29 and 36 denote mute circuits. The mute circuit 36 functions to stop microphone and audio amplification functions.

On the other hand, in the case where the user turns off the hook button 12 to make a telephone call, a switching circuit controller 11 turns on a telephone line switching circuit 9.

If a telephone/keyboard switching button 77 is pushed in a one-touch manner, then a telephone/computer switching indication lamp 78 is turned on.

In the case where the telephone/computer switching indication lamp 78 is lighted in the above manner, numeral keys 76 on the keyboard function as telephone dial keys.

When a telephone switching device 75 is turned on, a keyboard switching device 74 is turned off.

In the case where the telephone/keyboard switching button 77 is pushed in a one-touch manner under the condition that a telephone function is performed, the telephone/computer switching indication lamp 78 and telephone switching device 75 are turned off and the keyboard switching device 74 is turned on. As a result, the telephone dial keys 76 are returned to function as the numeral keys on the keyboard.

A telephone number from the telephone dial keys 76 is applied to the tone pulse generator 14 via a connector 3A and a interface function key 15. Then, a tone pulse signal from the tone pulse generator 14 is transferred to a telephone line via a tone pulse amplifier 13 and a transmission amplifier 22.

The reference numeral 8, not described, denotes a bridge diode, 30 denotes an amplifier, 34 denotes a transmission level balancer and 1A denotes a connector that is an external audio jack for recording/playback.

Next, the construction and operation of the semiconductor-type recording unit in the multifunction keyboard will be described with reference to FIGS. 4 and 8.

Figure 4:
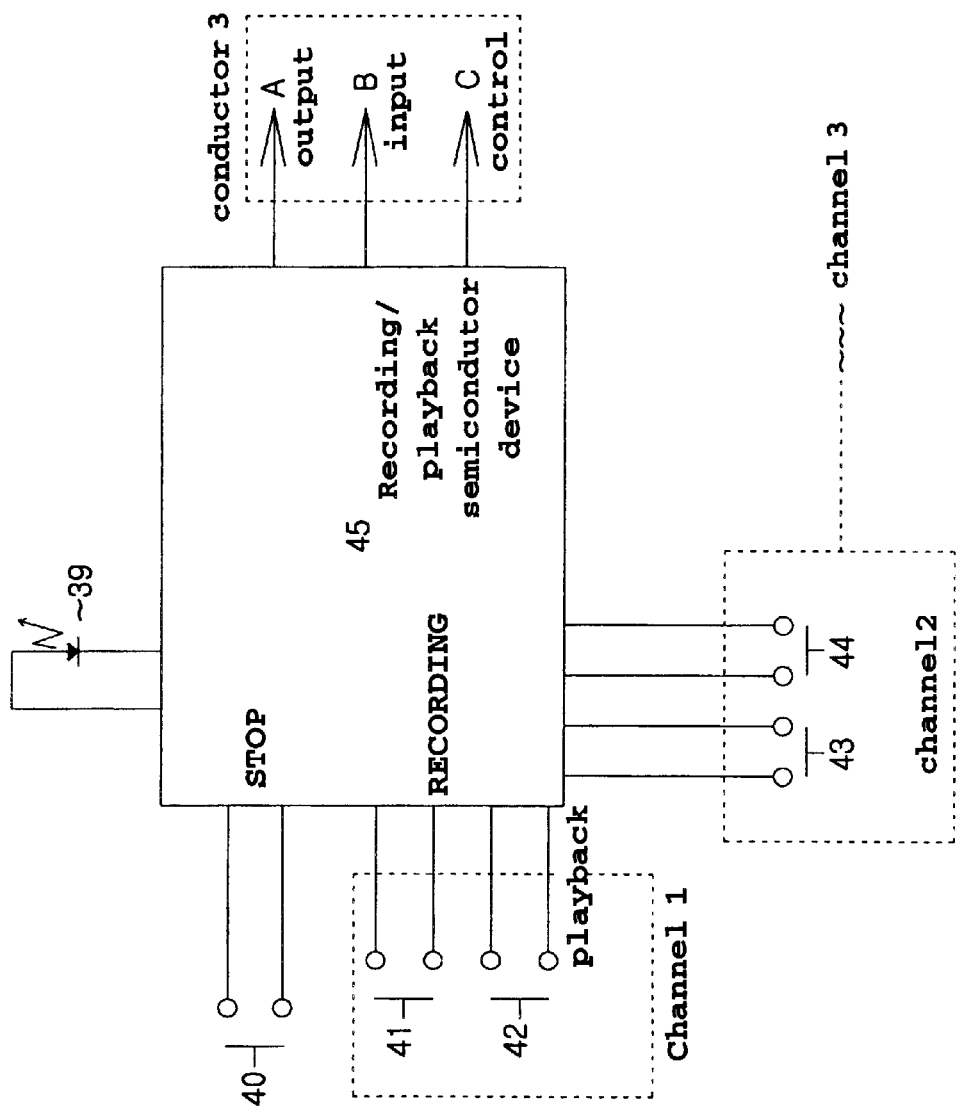
FIG. 4 is a functional block diagram of a recording unit in the multifunction keyboard in accordance with the present invention.

FIG. 4 is a functional block diagram of the semiconductor-type recording unit in the multifunction keyboard in accordance with the present invention.

First, if a first-channel recording button 41 is pushed, then a recording indication lamp 39 is turned on to inform the user of a recording state. While the first-channel recording button 41 is pushed, audio data from the external microphone 72 is stored in a first-channel location of a random access memory (RAM) via a connector 2B under the control of the audio signal input/output system controller 66.

The user can stop the above recording operation by pushing a recording stop button 40.

If a first-channel play button 42 is pushed, then a recording/playback one-chip 45 is operated to play back a message, recorded on the first-channel location of the RAM in the above manner.

A second-channel recording button 43 and second-channel play button 44 are provided corresponding to a second channel and operated in the same manner respectively as the first-channel recording button 41 and first-channel play button 42.

Audio data is stored in a second-channel location of the RAM in the same manner as the first-channel location. In the present embodiment, a plurality of channels are provided for the voice recording/playback.

Next, the construction and operation of the burglar alarm unit in the multifunction keyboard will be described with reference to FIGS. 5 and 6.

Figure 5:
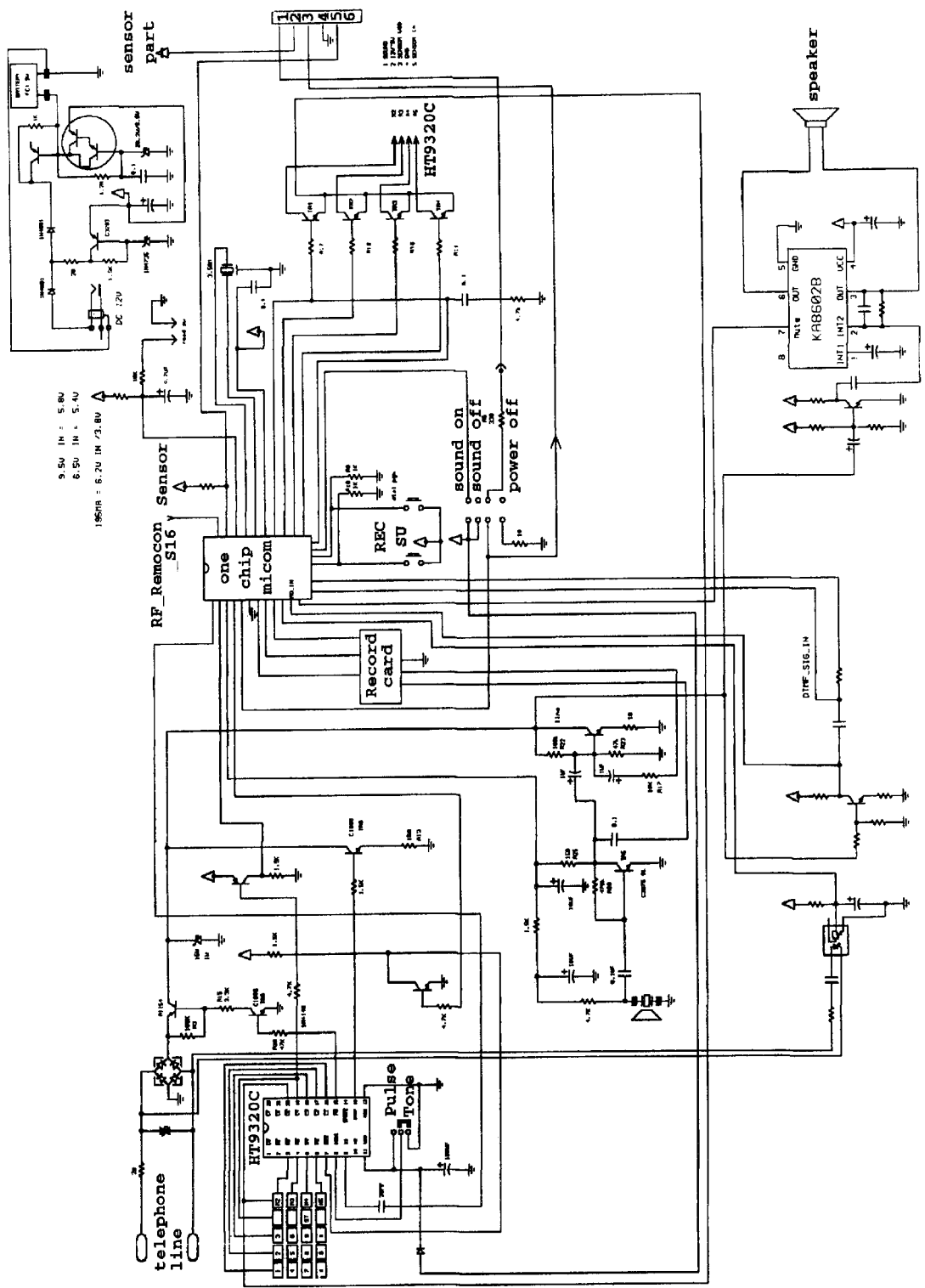
FIG. 5 is a circuit diagram of a burglar alarm unit in the multifunction keyboard in accordance with the present invention.
Figure 6:
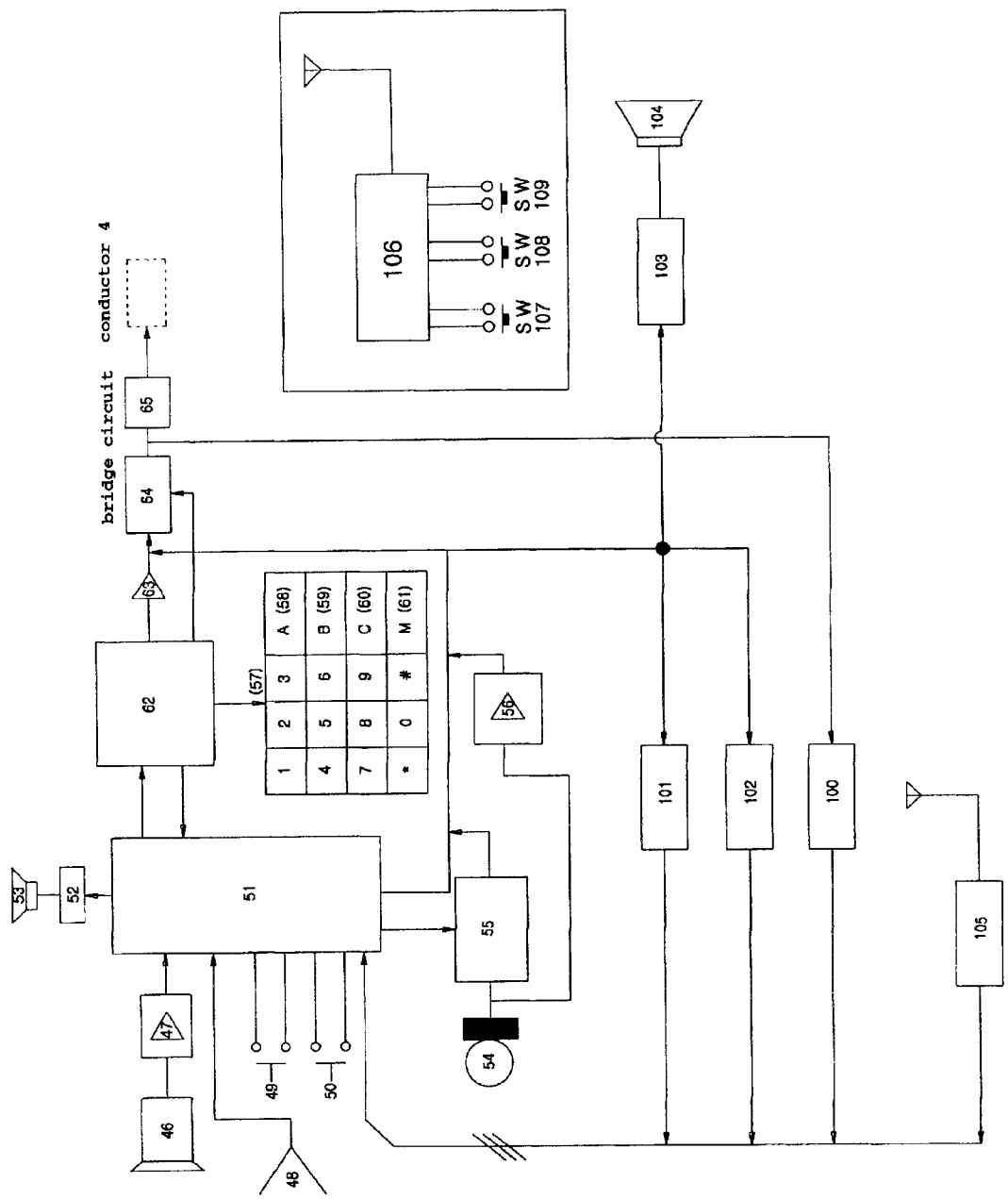
FIG. 6 is a functional block diagram of the burglar alarm unit in the multifunction keyboard in accordance with the present invention.

FIG. 5 is a circuit diagram of the burglar alarm unit in the multifunction keyboard in accordance with the present invention and FIG. 6 is a functional block main diagram of the burglar alarm unit in the multifunction keyboard in accordance with the present invention.

First, if a PIR sensor 46 senses a body temperature of a trespasser, then it outputs the resultant sense signal, which is amplified by a sense signal amplifier 47 and applied to a main controller 51. In response to the sense signal amplified by the sense signal amplifier 47, the main controller 51 operates a telephone function one-chip 62, which then turns on a telephone connection switch 64 and bridge circuit 65. Further, the telephone function one-chip 62 generates a tone pulse signal to dial a telephone number A in a memory corresponding to a telephone number memo 58 in a dial button part 57. Thereafter, if an office line response state detector 102 detects a normal telephone connection state, then the main controller 51 operates a recording/playback one-chip 55 to send a recorded message to a telephone line through a microphone amplifier 56.

If the recorded message is sent in the above manner, then the main controller 51 further sends a sensed on-the-spot sound from a microphone 54 to the telephone line through the microphone amplifier 56.

Further, in response to an external ring signal detected by a telephone ring signal detector 100 and an external tone signal detected by a telephone tone signal detector 101, the main controller 51 controls a variety of alarm functions such as an alarm ON function, alarm OFF function, sound sensing time control function, etc.

The office line response state detector 102 is adapted to monitor broken-down and short-circuited states of an office line, a response state of the office line and a busy state of the office line during an alarm operation by the main controller 51 and data transmission/reception states during a message sending operation by the main controller 51.

An audio amplifier 103 amplifies an audio signal, received from an external telephone during the alarm operation, and outputs the amplified audio signal through a speaker 104 to give a loud warning to a trespasser, thereby preventing burglary.

A radio frequency (RF) remote receiver 105 is adapted to receive a code from an RF remote controller 106 and transfer the received code to the main controller 51.

The RF remote controller 106 includes a plurality of function buttons such as an alarm ON button 107, alarm OFF button 108, emergency button 109, etc. The emergency button 109 acts to give an alarm to a liaison office in case of emergency.

The telephone number memos 58, 59 and 60 and keyphone control number memo 61 in the dial button part 57 are configured to give alarms to the office line and a keyphone dedicated line.

A call connection is established by dialing a combination of a telephone number M in the memory corresponding to the keyphone control number memo 61 and a telephone number A, B or C in the memory corresponding to the telephone number memo 58, 59 or 60.

If the call connection is established in the above manner, the main controller 51 sends a recorded message and a sensed on-the-spot sound to the telephone line and generates an alarm through an alarm amplifier 52 and buzzer 53.

A sensor input extension jack 48 is provided for extensible connection of a fire sensor, gas sensor, door opening sensor and other sensors.

If a message recording button 49 is pushed, then the main controller 51 operates the recording/playback module 55 to store a voice message from the microphone 54.

If a telephone number storage mode button 50 is pushed in a one-touch manner, the main controller 51 changes the current mode to a telephone number storage mode.

The entry of telephone numbers is made in the following manner.

The telephone number memo 58 is stored as the telephone number A in the memory by sequentially pushing a symbol #, a number to be stored, the symbol # and the telephone number memo button 58 in the telephone number storage mode.

The telephone number memo 59 is stored as the telephone number B in the memory by sequentially pushing the symbol #, a number to be stored, the symbol # and the telephone number memo button 59 in the telephone number storage mode.

The telephone number memo 60 is stored as the telephone number C in the memory by sequentially pushing the symbol #, a number to be stored, the symbol # and the telephone number memo button 60 in the telephone number storage mode.

The keyphone control number memo 61 is stored as the telephone number M in the memory by sequentially pushing the symbol #, a number to be stored, the symbol # and the keyphone control number memo button 61 in the telephone number storage mode.

In the case where there is no input in the telephone number memos 58, 59 and 60 and keyphone control number memo 61 in the dial button part 57, zeros, or "0s", are stored in the corresponding locations of the memory.

In the case where a keyphone control number is stored in the memory location M corresponding to the keyphone control number memo 61, the main controller 51 recognizes that an alarm is connected to the keyphone line and then establishes a call connection by dialing a combination of the keyphone control number in the memory location M and a telephone number in the memory location A, B or C corresponding to the telephone number memo 58, 59 or 60.

In the case where a zero, or "0", is stored in the memory location M corresponding to the keyphone control number memo 61, the main controller 51 recognizes that an alarm is connected to the office line and then establishes a call connection to the office line by dialing a telephone number in the memory location A, B or C corresponding to the telephone number memo 58, 59 or 60.

Next, the construction and operation of the computer speaker switching unit in the multifunction keyboard will be described with reference to FIG. 8.

An external input/output jack 73 acts as an audio recording/playback module interface, and a computer speaker volume adjustment unit 38 acts to adjust the volume of a computer speaker.

A computer speaker/headset mode switching button 113 functions to switch a telephone reception path between a computer speaker mode and a headset mode. If the telephone reception path is switched to the computer speaker mode, then an audio signal is outputted externally through the first channel speaker 70 and the second channel speaker 71. The reference numeral 67, not described, denotes a speaker system amplifier and 68 denotes a headset system amplifier.

Figure 7:
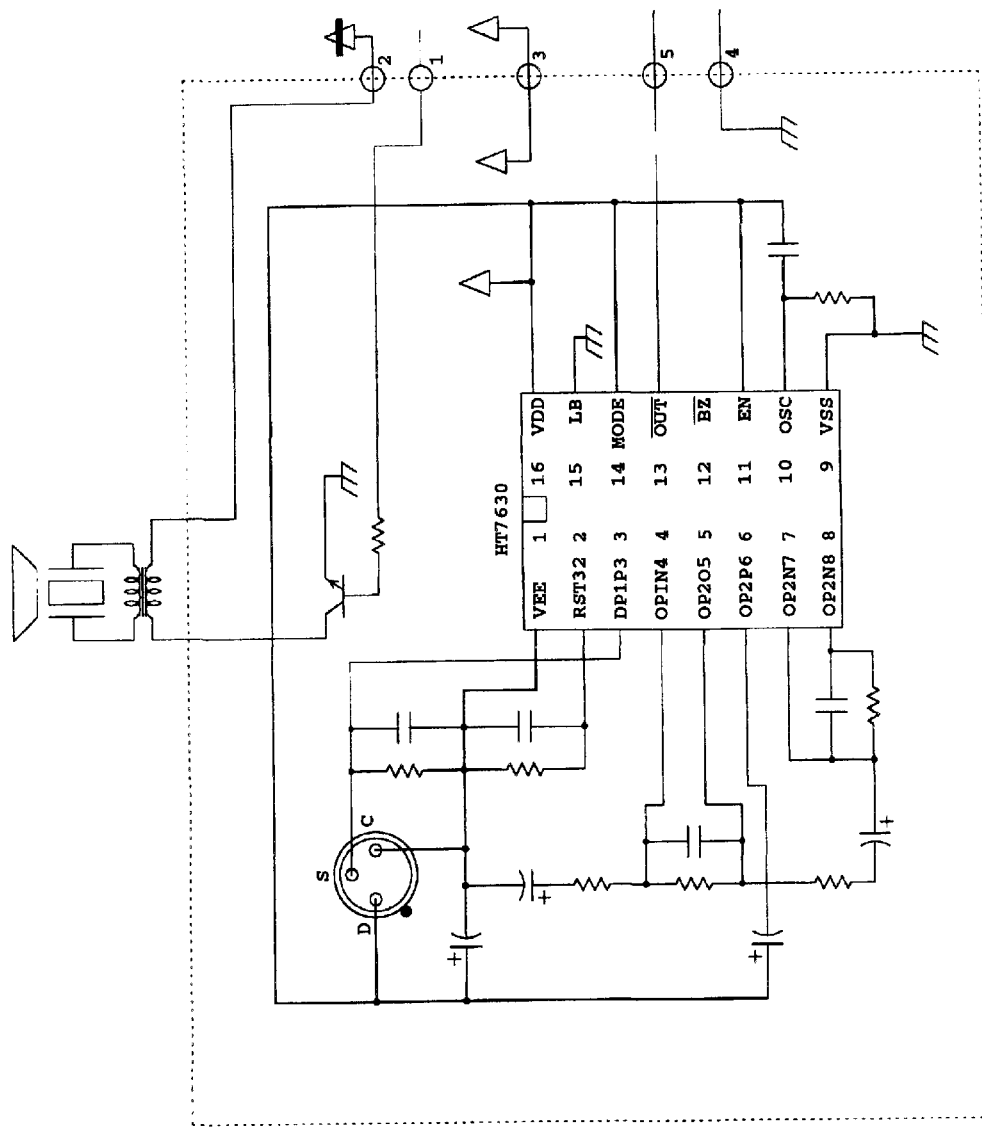
FIG. 7 is a circuit diagram of a PIR sensor in the multifunction keyboard in accordance with the present invention.
Figure 9:
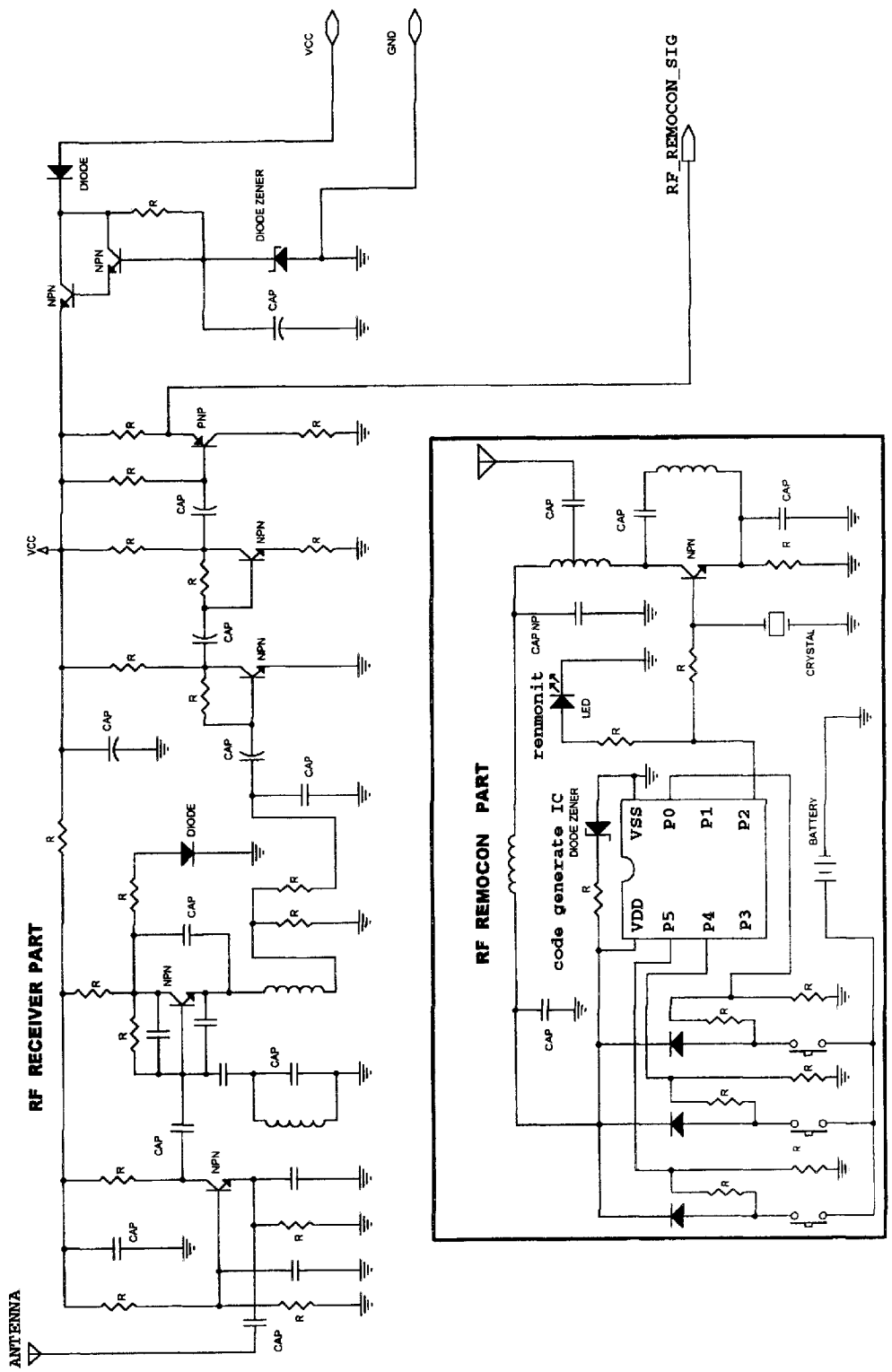
FIG. 9 is a circuit diagram of a remote controller and remote receiver in the burglar alarm unit in FIG. 6.

FIG. 7 is a circuit diagram of the PIR sensor 46 in the multifunction keyboard in accordance with the present invention and FIG. 9 is a circuit diagram of the remote controller 106 and remote receiver 105 in the burglar alarm unit in FIG. 6.

As apparent from the above description, the present invention provides a multifunction keyboard which is capable of performing a variety of functions such as an Internet phone function, audio input/output function, computer speaker switching function, recording function, burglar alarm function, telephone function, etc. in addition to the original function of displaying characters and symbols on the screen of a monitor. Therefore, the present invention has the effect of maximizing utilization of space and convenience in use.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multifunction keyboard comprising:

computer speaker switching means for adjusting a tone level and performing a computer speaker/headset mode switching operation;

audio input/output means having audio input and output terminals for inputting and outputting audio signals;

semiconductor-type recording means having a recording button for performing a recording operation while it is pushed by the user, and a play button for performing a playback operation when it is pushed by the user in a one-touch manner;

telephone means for conducting a direct conversation with a call-connected party and performing an Internet phone function, a telephone function, an extension exchange function, a redial function, a mute function, a hook function, a flash function, a headset function, a speaker phone function and a message recording function; and burglar alarm means having a pyroelectric infrared sensor for sensing a body temperature of a trespasser, a door opening sensor, a liquefied petroleum gas/liquefied natural gas sensor and a fire sensor, said burglar alarm means sensing the body temperature of the trespasser or an abnormal situation in the surroundings, automatically establishing a call to a preset telephone number, at once transferring a voice message and a sensed on-the-spot sound to the preset telephone number and generating an alarm thereto.

2. The multifunction keyboard as set forth in claim 1, wherein said burglar alarm means is adapted to, if a plurality of telephone numbers are preset, generate alarms to the preset telephone numbers and repetitively cycle through the preset telephone numbers from the beginning to the end.

3. The multifunction keyboard as set forth in claim 2, wherein said burglar alarm means is configured to be remotely controllable by an external telephone.

4. The multifunction keyboard as set forth in claim 1, wherein said telephone means includes:
- a call termination lamp turned on in response to an incoming call signal, said call termination lamp being projected out of the land of said keyboard;
- ringer means for generating a ring signal in response to a turned-on state of said call termination lamp and outputting it externally through a speaker, said ringer means including a bridge diode, a ring chip and a ring amplifier;
- a telephone system controller for controlling a voice transmission/reception network controller in response to an off state of a hook button;
- voice transmission/reception network means connected to an audio signal input/output system controller under the control of said voice transmission/reception network controller, said voice transmission/reception network means including a reception amplifier, a reception buffer, an automatic gain controller, a transmission amplifier and an audio signal amplifier;
- an input controller for controlling the input of an audio signal from a call-connected party in response to a turned-on state of a hands-free button;
- a tone pulse generator for generating a tone pulse signal corresponding to the audio signal from the call-connected party under the control of said input controller;
- a speaker phone controller for controlling the input/output of a speaker phone;
- an attenuation controller for controlling an attenuation level of the tone pulse signal from said tone pulse generator under the control of said speaker phone controller;
- first and second amplifiers for sequentially amplifying an output signal from said attenuation controller and transferring the amplified signal to said audio signal input/output system controller;
- said audio signal input/output system controller automatically selecting one of a headset and an external microphone according to a given system condition and transferring an audio signal from the selected headset or external microphone to said transmission amplifier via a third amplifier and said attenuation controller;
- said transmission amplifier amplifying the audio signal transferred from said audio signal input/output system controller and transmitting the amplified audio signal to a telephone line;
- a melody generator for generating a melody in response to a turned-on state of a hold button under the control of said input controller;
- a switching circuit controller for turning on a telephone line switching circuit in response to said off state of said hook button;
- a telephone/computer switching indication lamp turned on when a telephone/keyboard switching button is pushed in a one-touch manner;
- a plurality of numeral keys functioning as telephone dial keys in response to said turned-on state of said telephone/computer switching indication lamp;
- a telephone switching device turned on in response to said turned-on state of said telephone/computer switching indication lamp;
- a keyboard switching device turned off in response to said turned-on state of said telephone/computer switching indication lamp;
- a function key interface for transferring a telephone number from said telephone dial keys to said tone pulse generator;
- said tone pulse generator generating a tone pulse signal corresponding to the telephone number transferred from said function key interface;
- a tone pulse amplifier for amplifying said tone pulse signal corresponding to the transferred telephone number, generated by said tone pulse generator; and
- a tone pulse transmission amplifier for transmitting said tone pulse signal amplified by said tone pulse amplifier to said telephone line.

5. The multifunction keyboard as set forth in claim 4, wherein, if said telephone/keyboard switching button is pushed in a one-touch manner under the condition that a telephone function is performed, said telephone/computer switching indication lamp and telephone switching device are turned off, said keyboard switching device is turned on and said telephone dial keys are returned to function as said numeral keys.

6. The multifunction keyboard as set forth in claim 1, wherein said semiconductor-type recording means includes:
- a plurality of recording buttons corresponding respectively to a plurality of channels;
- a plurality of play buttons corresponding respectively to said channels;
- a recording indication lamp turned on in response to a pushed state of one of said recording buttons corresponding to a specific one of said channels to inform the user of a recording state;
- a recording/playback module for storing audio data from an external microphone in a specific location of a random access memory while said recording button corresponding to said specific channel is pushed and outputting the stored audio data in response to a pushed state of one of said play buttons corresponding to said specific channel; and
- a recording stop button for stopping a recording operation.

7. The multifunction keyboard as set forth in claim 1, wherein said burglar alarm means includes:
- a sense signal amplifier for amplifying a sense signal from said pyroelectric infrared sensor if the body temperature of the trespasser is sensed by said pyroelectric infrared sensor;
- a main controller for controlling the entire operation of said burglar alarm means;
- a telephone function module operated in response to an output signal from said sense signal amplifier for turning on a telephone connection switch and a bridge circuit and generating a tone pulse signal to dial a specific telephone number in a memory;

an office line response state detector for monitoring a normal telephone connection state, broken-down and short-circuited states of an office line, a response state of said office line and a busy state of said office line during an alarm operation and data transmission/reception states during a message sending operation;

a recording/playback module for sending a recorded message to a telephone line if said normal telephone connection state is detected by said office line response state detector;

a microphone amplifier for amplifying the recorded message from said recording/playback module or a sensed on-the-spot sound from a microphone and outputting the amplified result to said telephone line;

an alarm amplifier for amplifying an alarm signal;

a buzzer for generating an alarm in response to the alarm signal amplified by said alarm amplifier;

a telephone ring signal detector for detecting an external ring signal;

a telephone tone signal detector for detecting an external tone signal;

said main controller controlling a variety of alarm functions including an alarm ON function and an alarm OFF function in response to said external ring signal detected by said telephone ring signal detector and said external tone signal detected by said telephone tone signal detector;

an audio amplifier for amplifying an audio signal, received from an external telephone during the alarm operation, and outputting the amplified audio signal through a speaker to give a loud warning to the trespasser;

a radio frequency remote controller for remotely controlling said main controller, said radio frequency remotely controller having a plurality of function buttons including an alarm ON button, an alarm OFF button and an emergency button, said emergency button acting to give an alarm to a liaison office in case of emergency; and a radio frequency remote receiver for receiving a code from said radio frequency remote controller and transferring the received code to said main controller.

* * * * *